United States Patent
Clark

(10) Patent No.: US 7,016,603 B2
(45) Date of Patent: Mar. 21, 2006

(54) WIRELESS COMMUNICATION MODULE

(75) Inventor: James E. Clark, S. Burlington, VT (US)

(73) Assignee: Lab Partners Associates, Inc., Burlington, VT (US)

( * ) Notice: Subject to any disclaimer, the term of this patent is extended or adjusted under 35 U.S.C. 154(b) by 0 days.

(21) Appl. No.: 10/306,759

(22) Filed: Nov. 26, 2002

(65) Prior Publication Data

US 2004/0101295 A1    May 27, 2004

(51) Int. Cl.
*G03B 17/00*    (2006.01)
*G03B 17/48*    (2006.01)

(52) U.S. Cl. .......................... 396/56; 396/59; 396/429
(58) Field of Classification Search ............ 396/56–59, 396/263, 429, 661; 348/14.05, 14.02, 114, 348/211.99, 211.1, 211.2, 725, 734
See application file for complete search history.

(56) References Cited

U.S. PATENT DOCUMENTS

| | | | |
|---|---|---|---|
| 4,355,309 A | 10/1982 | Hughey et al. | 340/825.53 |
| 4,482,895 A | 11/1984 | Weinberg | 340/825.69 |
| 4,509,845 A | 4/1985 | Mizokami | 354/420 |
| 4,603,954 A | 8/1986 | Egawa et al. | 354/137 |
| 4,988,584 A | 1/1991 | Shaper | 429/50 |
| 5,283,610 A | 2/1994 | Sasaki | 354/416 |
| 5,299,012 A | 3/1994 | Tsuruta et al. | 348/370 |
| 5,359,375 A | 10/1994 | Clark | 354/131 |
| 5,422,543 A | 6/1995 | Weinberg | 315/129 |
| 5,436,531 A | 7/1995 | Weinberg | 315/241 |
| 5,692,223 A | 11/1997 | Ichikawa et al. | 396/182 |
| 5,708,833 A * | 1/1998 | Kinney et al. | 710/301 |
| 5,721,971 A | 2/1998 | Sasaki | 396/56 |
| 5,754,898 A | 5/1998 | Nakano | 396/180 |
| 6,006,039 A * | 12/1999 | Steinberg et al. | 396/57 |
| 6,127,940 A | 10/2000 | Weinberg | 340/825.69 |
| 6,167,199 A | 12/2000 | Fukui | 396/57 |
| 6,278,481 B1 * | 8/2001 | Schmidt | 348/64 |
| 6,351,610 B1 | 2/2002 | Numako et al. | 396/180 |
| 6,353,711 B1 | 3/2002 | Numako et al. | 396/180 |
| 6,366,737 B1 | 4/2002 | Numako et al. | 396/180 |
| 6,404,987 B1 | 6/2002 | Fukui | 396/56 |
| 6,618,557 B1 * | 9/2003 | Ziemkowski | 396/56 |
| 2002/0009296 A1 | 1/2002 | Shaper et al. | 396/67 |
| 2002/0067425 A1 | 6/2002 | Iverson | 348/373 |

(Continued)

FOREIGN PATENT DOCUMENTS

EP    0984320    8/1999

(Continued)

OTHER PUBLICATIONS

Mahany, Ronald L., PCT WO 96/38925, Dec. 5, 1996.*

(Continued)

*Primary Examiner*—David Gray
*Assistant Examiner*—Rochelle Blackman
(74) *Attorney, Agent, or Firm*—Downs Rachlin Martin PLLC

(57) ABSTRACT

A microcontroller radio card (2) for insertion into a first device, e.g., a camera (10) to allow for remote operation of a second device, e.g., a flashpack (22), utilizing the existing controls of the first device. The card includes a base (34) populated with various microelectronic devices for transmitting and or receiving RF or other signals used in the control and operation of the second device. A central processing unit (CPU) (41) translates signals received from the first device and controls the generation of corresponding signals to be transmitted to the second device in response to the signals received from the first device. Signals are transmitted to the second device via a transceiver chip (43).

31 Claims, 9 Drawing Sheets

U.S. PATENT DOCUMENTS

2002/0067923 A1 * 6/2002 Fujimura ................. 396/429
2002/0127019 A1 * 9/2002 Ogasawara ............. 396/661

FOREIGN PATENT DOCUMENTS

JP             05-093948       *    4/1993

OTHER PUBLICATIONS

XE-200 RF Shutter Release for Rebel 2000; http://zeno-puselectronix.com/Xe-200.html; viewed on Sep. 9, 2002.
Equipment Corner—News & Notes for all Those Gear-Heads; pp. 1-3; http://www.sportsshooter.com/news_story.html?id=594; posted Nov. 26, 2001; by Robert Hanashiro.
FreeWire™; http://www.qtm.com/wireless/freewire.html; pp. 1-6; viewed Feb. 8, 2002.
PocketWizard MultiMAX Transceiver {Remote Control Radio Slave}; pp. 1-6; http://pocketwizard.com/HTML/products.asp: viewed Feb. 8, 2002.
Beta testing of prototype module by Sports Illustrated photographer in late October and November of 2001.
Beta testing of prototype module by Nikon employee on Oct. 25, 2001.
Beta presentation of prototype module at Nikon and Mamiya meetings on Nov. 1, 2001.
Nikon camera at Nikon for repair of locked up mirror and camera circuitry on or about Nov. 20, 2001.
Beta presentation of prototype module at Nikon meeting on Nov. 17, 2001.

* cited by examiner

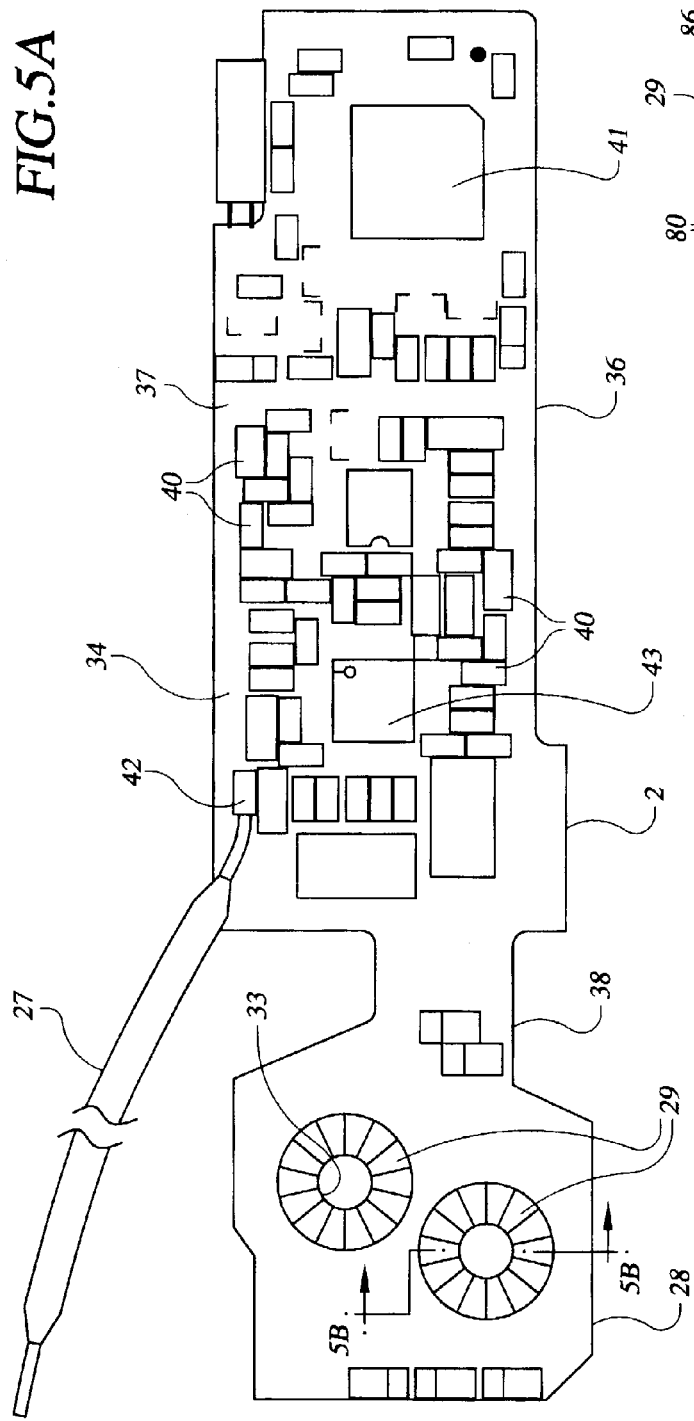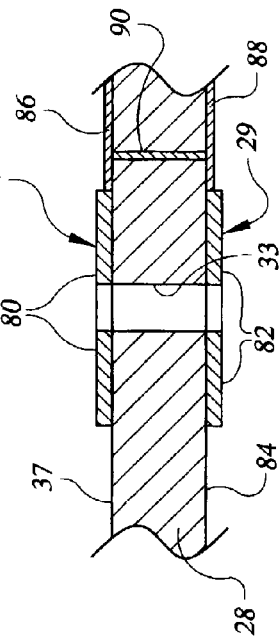

WIRELESS COMMUNICATION MODULE

FIELD OF THE INVENTION

The present invention relates generally to the field of wireless communication. More particularly, the present invention is directed to a wireless communication module for providing existing devices with built-in wireless control capabilities.

BACKGROUND OF THE INVENTION

In the field of photography, remote lighting for photography can be difficult, especially for outdoor shots. Photographing a building or other outdoor scene presents a significant challenge when the lights must be close to the building or scene and the camera must be further away to take in the entire building or scene. In certain situations, cables are used for remote photography lighting. However, because it is typically illegal to string cables across a public street, the use of cable is often not practical. Even if it is possible to use cables, it is not preferred because they are heavy, unwieldy, and tangle easily. In addition, the cables must be hidden from view in the photograph.

As a result of the difficulties encountered using cables with remote photography lighting, various remote control devices utilizing multiple wireless technologies have been developed to remotely control photography equipment such as flashpacks and secondary cameras. Infrared (IR), cellular, light pulse, and radio frequency (RF) are some examples of wireless technologies employed in prior art devices. One particularly effective system is the PocketWizard® MultiMAX™ designed by Lab Partners Associates Inc. of South Burlington, Vt. The PocketWizard® MultiMAX™ is an intelligent device that utilizes RF technology with a fully programmable transceiver. Much of the technology incorporated in the design of the PocketWizard® MultiMAX™ is disclosed in U.S. Pat. No. 5,359,375, which is incorporated by reference as if fully disclosed herein, issued to Clark on Oct. 25, 1994.

Typically, prior art devices require the connection of a transmitter, receiver, or transceiver to the exterior of a camera. The attachment of a transmitter, receiver, or transceiver to the exterior of a camera or other device increases the weight of the device and can make the device difficult to handle. In addition, the attached device is often easily damaged. However, the only way to provide existing devices that were not originally designed to include remote control functionality with such functionality is to attach a transmitter, receiver, or transceiver to the exterior of the device. Thus, in order to provide remote control functionality to existing devices, a separate transmitter, receiver, or transceiver must be attached to the exterior of the device body as in the example of a camera described previously.

SUMMARY OF THE INVENTION

In one embodiment, the present invention includes a wireless communication module that can be inserted into both existing devices that were not designed to have remote control functionality thereby adding such functionality to the device and new devices specifically designed for incorporation of the module.

In another embodiment, the present invention provides a wireless communication module for insertion into a body of a camera to give the camera the ability to communicate with a remote device without disrupting normal camera function, the camera having camera controls and being originally designed without, or with different, remote communication functionality. The module includes a base sized and configured to be capable of being inserted into the camera body without substantially modifying the camera. The module also includes a transmitter or transceiver attached to the base. The module includes a camera control signal intercept connector for operatively connecting the transmitter or transceiver to the camera controls. The module, when inserted in the camera body and operatively connected to the camera controls via the connector, does not interfere with the normal function of the camera.

In yet another embodiment, the present invention provides a camera capable of remotely operating a second device. The camera includes a camera body including camera controls, mechanical controls, and a conductor for conducting electrical signals between the camera controls and the mechanical controls, the camera body being not originally designed to remotely operate a second device. The camera also includes a microcontroller radio card having a transmitter or transceiver for transmitting signals from the camera body to the second device, the card sized for insertion into the camera body, the card directly connected to the conductor, thereby communicatively joining the card with the camera controls, the card not interfering with the normal function of the camera.

In still another embodiment, the present invention provides a system for modifying a camera, the camera including a housing having camera controls, so that the camera is capable of remotely communicating with a second device without interfering with normal camera function. The system includes a microcontroller radio card having a transmitter or transceiver for transmitting signals from the camera to the second device, the card capable of being inserted into the camera without substantially modifying the housing, the card including a camera control signal intercept connector to be operatively connected to the camera controls, the card being sized and configured to be received in a camera body that was originally designed without, or with different, remote communication functionality, the card not interfering with the normal function of the camera.

In still yet another embodiment, the present invention provides a method of modifying a camera, the camera including a housing having camera controls, so that the camera is capable of remotely communicating with a second device without interfering with normal camera function. The method includes physically connecting a microcontroller radio card having wireless communication capabilities to the camera controls; and inserting the microcontroller radio card in the camera without substantially modifying the housing, wherein the microcontroller radio card is sized and configured to be received in a camera housing that was originally designed without or with different, remote communication functionality, and wherein the microcontroller radio card does not interfere with the normal function of the camera.

In a further embodiment, the present invention provides a wireless communication module for insertion into a camera without interfering with normal camera function, the camera having camera controls and a first processor for controlling the operation of the camera. The module includes a base capable of being inserted completely within the camera without substantially modifying the camera; a transmitter or transceiver attached to the base; a second processor attached to the base, the second processor controlling communication between the camera and a remote device; and a camera control signal intercept connector for operatively connecting the transmitter or transceiver to the camera controls, wherein the module, when inserted in the camera body and operatively connected to the camera controls via the connector, does not interfere with the normal function of the camera.

In still a further embodiment, the present invention provides a system for modifying a camera, the camera including a housing having camera controls and a first processor for controlling the camera, so that the camera is capable of remotely communicating with a second device without interfering wit normal camera function. The system includes a microcontroller radio card having a transmitter or transceiver for transmitting signals from the camera to the second device, the card capable of being inserted completely within the camera without substantially modifying the housing, the card including a camera control signal intercept connector to be operatively connected to the camera controls, the card having thereon a second processor for controlling communication between the camera and the second device, the card, when inserted in the camera body and operatively connected to the camera controls via the connector, not interfering with the normal function of the camera.

In yet a further embodiment, the present invention provides a method of modifying a camera, the camera including a housing having camera controls and a first processor for controlling the camera operation, so that the camera is capable of remotely communicating with a second device without interfering with normal camera function. The method includes operatively connecting a microcontroller radio card having wireless communication capabilities to the camera controls, the microcontroller radio card having thereon a second processor for controlling the communicating; and inserting the microcontroller radio card completely within the camera without substantially modifying the housing or interfering with normal camera function.

In still yet a further embodiment, the present invention provides a wireless communication module for insertion into a body of a camera to give the camera the ability to communicate with a remote device without disrupting normal camera function, the camera having camera controls and being originally designed without, or with different, remote communication functionality The module includes a base sized and configured to be capable of being inserted into the camera body without substantially modifying the camera; a transmitter or transceiver attached to the base; and a connector for operatively connecting the transmitter or transceiver to the camera controls, wherein the module, when inserted in the camera body and operatively connected to the camera controls via the connector, does not interfere with the normal function of the camera, and wherein the base is operably joined with a detachable antenna, the antenna adapted to transmit and receive signals to and from the camera.

Other features, utilities and advantages of various embodiments of the invention will be apparent from the following more particular description of embodiments of the invention as illustrated in the accompanying drawings.

BRIEF DESCRIPTION OF THE DRAWINGS

For the purpose of illustrating the invention, the drawings show one or more forms of the invention. However, it should be understood that the present invention is not limited to the precise arrangements and instrumentalities shown in the drawings, wherein:

FIG. 5A is a top plan view of one embodiment of the wireless communication module of the present invention;

FIG. 5B is a partial side section view taken along line 5B—5B of FIG. 5A;

DETAILED DESCRIPTION OF THE INVENTION

The wireless communication module of the present invention adds wireless control functionality to existing devices, for example cameras. The module is inserted in a device that was originally designed without, or with different, remote control functionality. A device including the module can remotely operate other devices using the existing controls of the device. The module enables a user to remotely operate external devices without any cables running back to the device. It also allows a user to remotely operate other devices that include the wireless communication module.

In one embodiment, the module is installed in a camera and is used to add wireless flashpack and wireless camera controls to the camera. The module permits a user to remotely fire flashpacks without any cables running back to the camera. In addition, a camera including a wireless communication module may be remotely controlled and/or programmed by another camera including a module and vice versa. Depending upon the control command sent, a module inserted in one camera could also be used to remotely change the shutter speed or some other setting of a second camera containing a module.

Figure 1:
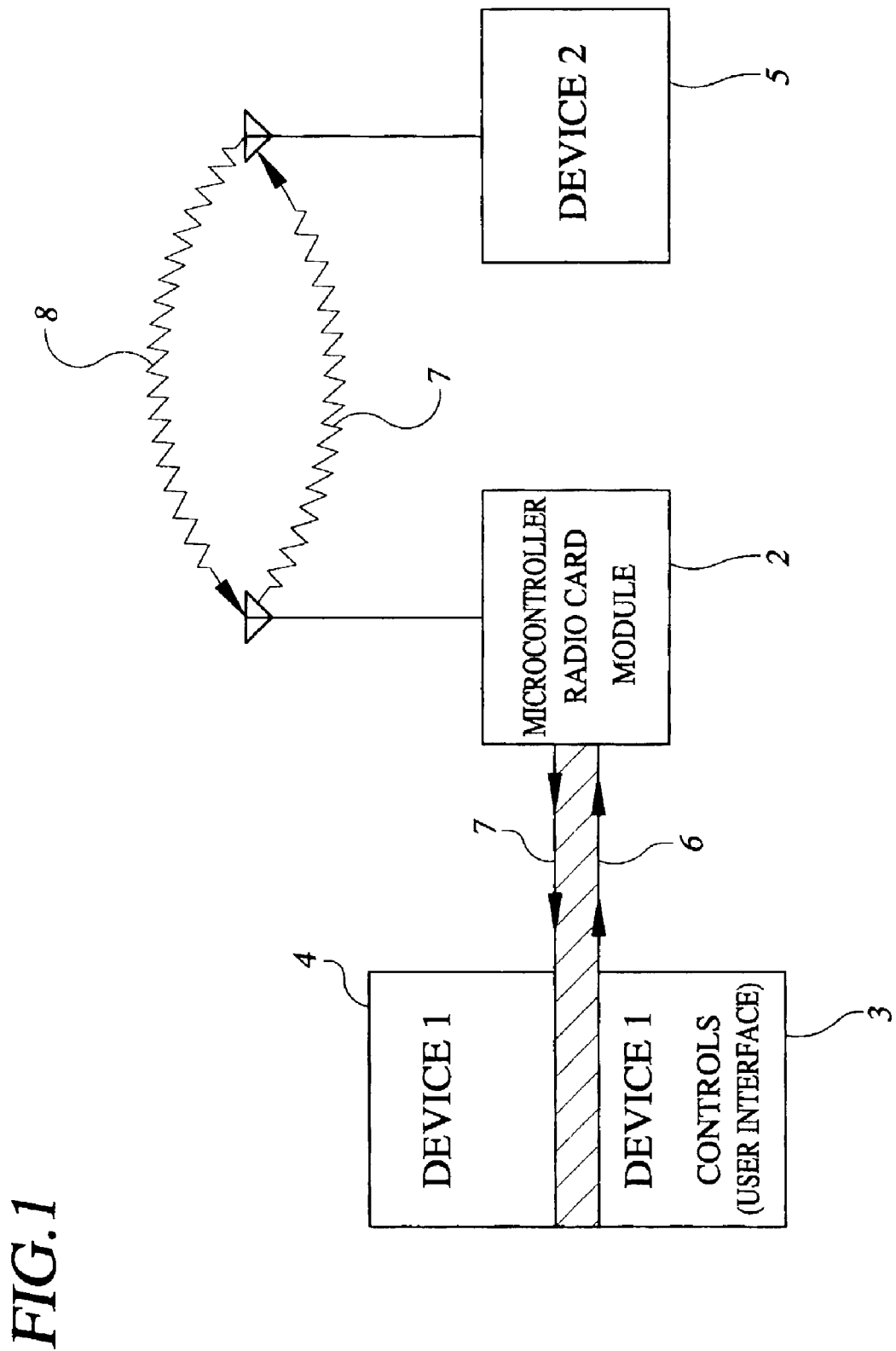
FIG. 1 is a block diagram that shows the flow of signals within one embodiment of the wireless communication module of the present invention.

Referring to FIG. 1, wireless communication module 2 serves as an intermediary device between the controls 3 of a first device 4, the first device, and one or more remote devices 5. FIG. 1 is a block diagram that illustrates the general flow of communication signals in module 2. In operation, module 2 intercepts signals 6 as they flow from controls 3 of first device 4 to other elements of the first device (e.g, signals generated from user interface inputs). Next, module 2 translates signals 6 and generates corresponding signals 7 in response to signals 6 received from first device 4. The corresponding signals 7 are transmitted to remote devices 5 via a transmitter, transceiver, or similar mechanism and or back to first device 4 itself.

Module 2 may also receive signals 8 from remote device 5 via a receiver (not shown). In receiver mode, module 2 translates signals 8 and generates corresponding signals 7 to send to first device 4.

Figure 2:
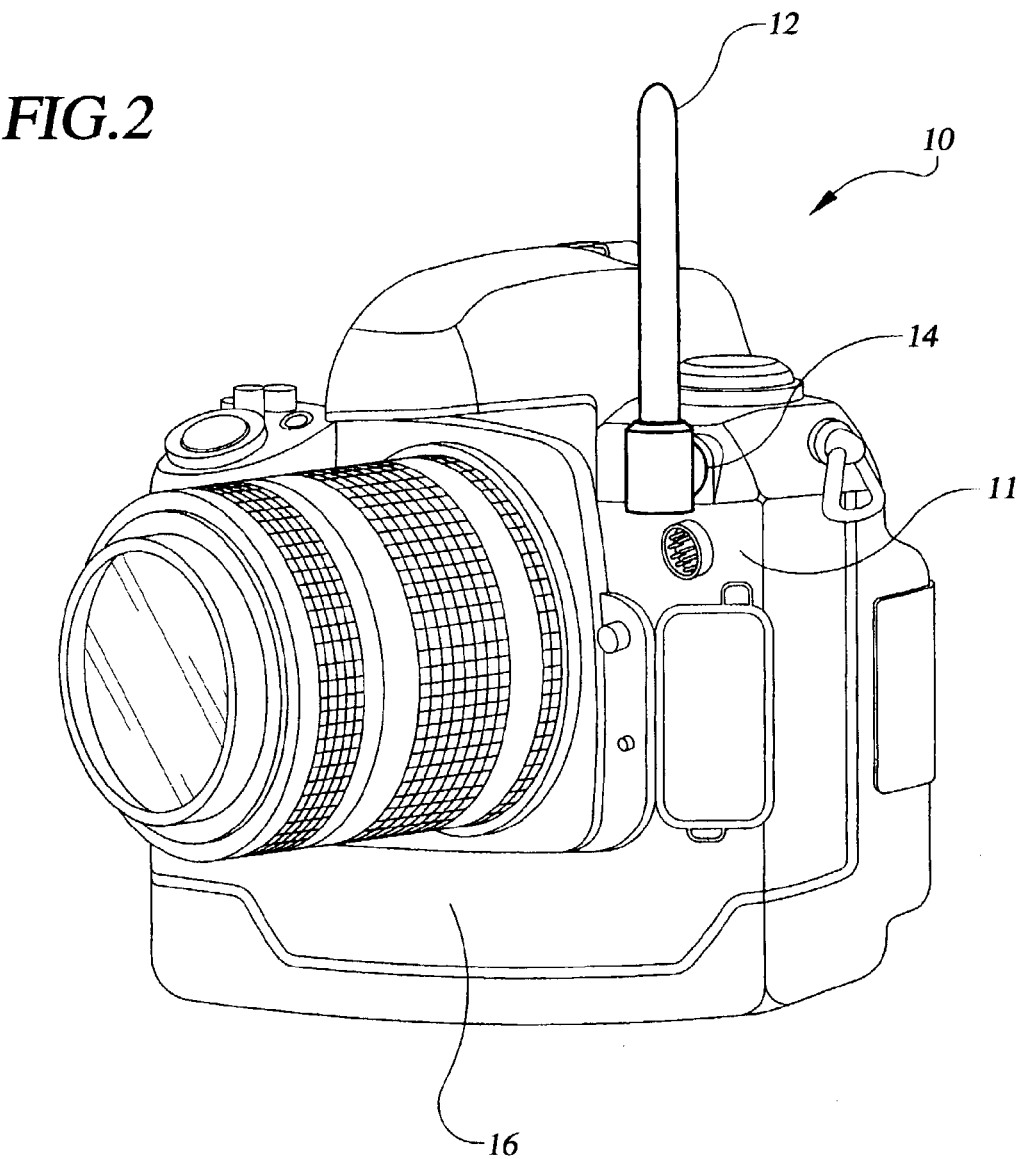
FIG. 2 is a front right isometric view of a camera containing one embodiment of the wireless communication module of the present invention including a removably attachable antenna connected to the PC connector port on the camera.
Figure 3:
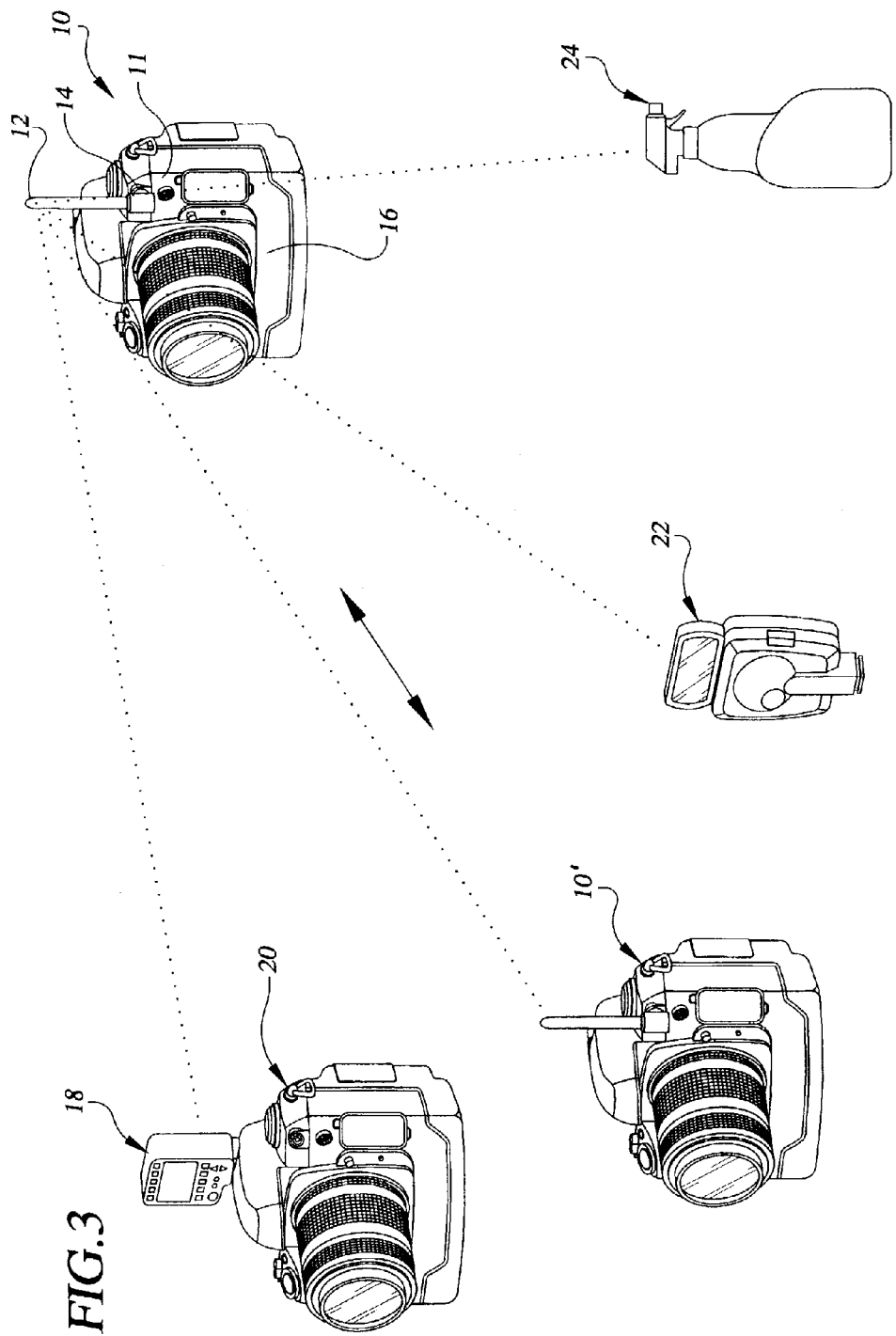
FIG. 3 is a perspective view of a camera including one embodiment of the wireless communication module of the present invention and devices that typically communicate with the module.

FIGS. 2–3 illustrate a camera 10 including one embodiment of the wireless communication module 2 of the present invention. Notably, the wireless communication module 2 resides entirely within the housing 11 of camera 10. As illustrated in FIG. 2, the only feature that allows one to detect the presence of the wireless communication module 2 within camera 10 is the presence of an external antenna 12 connected to a PC connector 14 on the face 16 of the camera. As described more fully below, when module 2 is not in use, antenna 12 may be detached thereby removing structural signs indicating the presence of a wireless communication module 2 within camera housing 11. When module 2 is not in use, camera 10 will generally function normally but without wireless communication functionality.

FIG. 3 illustrates typical devices that may communicate with wireless communication module 2 of the present invention installed in housing 11 of camera 10. One such device is a receiver device 18 that can be attached to the exterior of a camera 20 that does not include the module thereby allowing camera 10 to control certain functions of camera 20. Alternatively, receiver device 18 may be connected to a remote flash device or flashpack 22. In the instance where a flashpack 22 has either a wireless communication module 2 installed therein, or other receiving means installed therein, camera 10 may communicate directly with a flashpack 22.

Two or more cameras having wireless communication module 2 may communicate with one another. A user can send and receive messages between two cameras 10 and 10 having modules 2 thereby allowing a user to wirelessly trigger either of the two cameras using the controls of the other camera. A user will also be able to alter the settings of one camera using the controls of another camera wirelessly.

Wireless communication module 2 can also be used to wirelessly communicate with other external devices such as a spray bottle 24 or other mechanical device that includes reception capabilities. In the example of a camera 10 outfitted with module 2, the ability to actuate external devices such as spray bottles or other mechanical devices wirelessly may be beneficial to photographers trying to precisely capture events related to the external device. For example, a photographer might want to capture an image of vapor droplets as they exit the nozzle of a spray bottle. As one can recognize, the ability to precisely control the time that the vapor droplets exit the nozzle will enable a user to more precisely capture the image of those droplets. Although the examples described herein are in relation to a camera, one skilled in the art will recognize that wireless communication module 2 can also be used in myriad devices other than cameras to provide such devices with wireless communication functionality.

Figure 4:
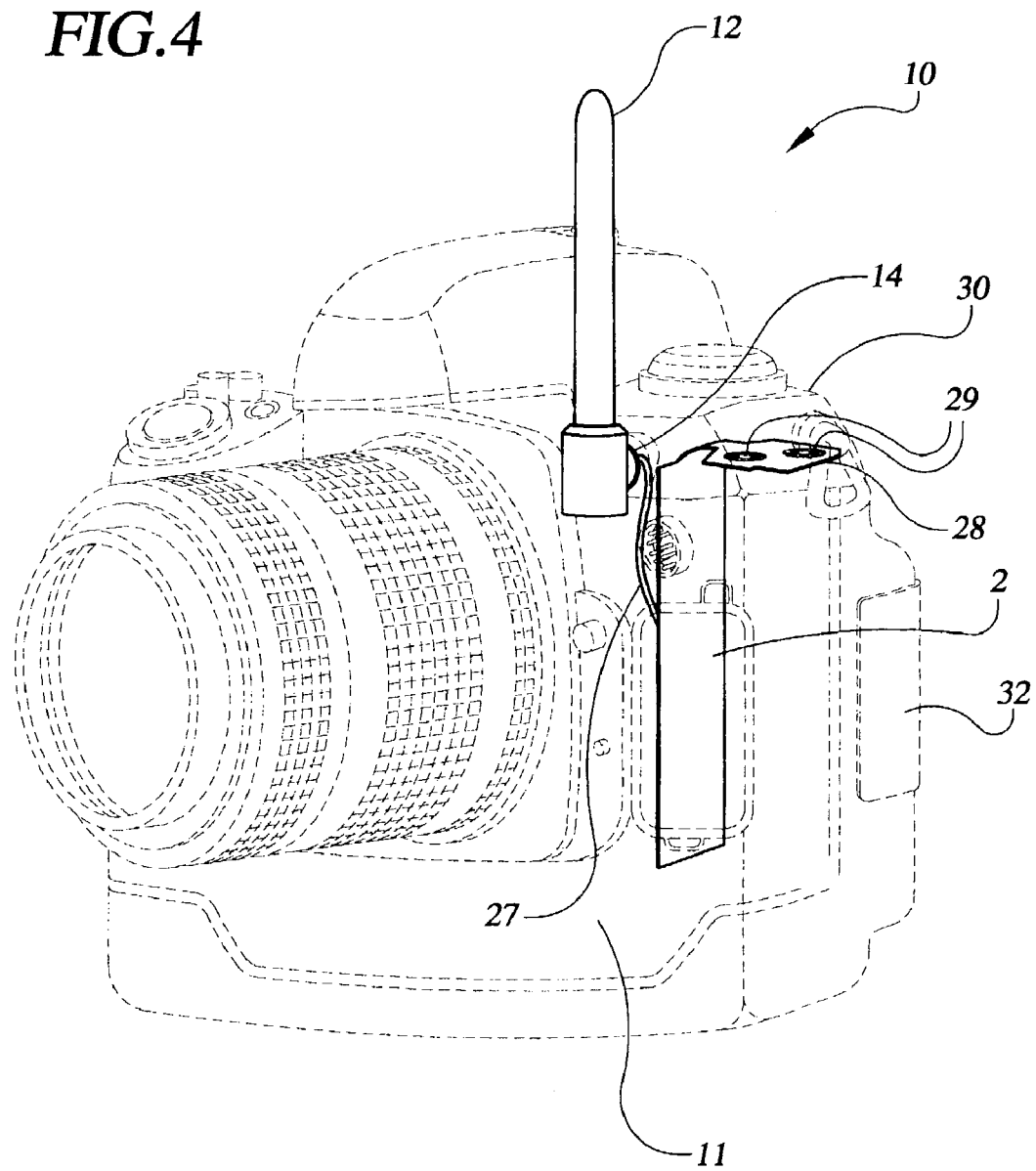
FIG. 4 is a phantom front isometric view of a typical camera that shows the positioning of one embodiment of the wireless communication module of the present invention and associated detachable antenna.

FIGS. 4–6 illustrate one embodiment of wireless communication module 2 as installed in camera 10. Module 2 typically resides within camera housing 11 on the side of the housing adjacent PC connector 14. Removable antenna 12, which is removably attachable to PC connector 14, is adapted for use with module 2 and transmits signals to and from the module via a connection 27 between the module and the PC connector. Module 2 includes a head portion 28 that contains two substantially circular flex connectors 29. When installed in camera 10, head portion 28 is folded over so that it is substantially perpendicular to the remaining portions of module 2. In certain cameras (such as a Nikon® D1), the screws (not shown) that both connect upper portion 30 of camera housing 11 to lower portion 32 of the camera housing serve as a path for electrical signals between the camera controls housed in the upper portion of the camera housing and the mechanical controls housed in the lower portion of the camera housing. Module 2 takes advantage of this functionality by providing apertures 33 in flex connectors 29. When the screws used to secure together upper portion 30 and lower portion 32 are received in apertures 33, flex connectors 29 permit wireless communication module 2 to intercept the electronic signals transferred between the camera controls and the mechanical controls in camera 10. In cameras that do not utilize body screws as a conduit for electrical signals, module 2 may be more directly connected to the camera controls using any appropriate means including soldered connections or otherwise.

FIG. 5A is a top plan view of one embodiment of wireless communication module 2 similar to that installed in camera 10 of FIG. 4. Generally, module 2 is defined by a base 34, typically a circuit board that includes three main portions: a substantially rectangular body portion 36; a narrow throat or neck portion 38; and, as noted above, a substantially square head portion 28. In at least one embodiment, base 34 is a 6-layer ridged flex circuit board. This embodiment has many ground layers to keep all digital signals clean and isolated from the RF signals.

Surface 37 of body portion 36 typically includes module microchips 40 and other electrical connections. Microchips 40 and other electrical connections typically include at least a central processing unit (CPU) 41, module controls 42, and a transmitter, receiver, or transceiver chip 43 to provide wireless communication capabilities within module 2, as described in more detail below. Although the entire module 2, illustrated in FIG. 5A, is typically fabricated of a non-rigid material, throat 38 and head portions 28 are particularly flexible to allow the head portion to be bent at a substantially perpendicular angle to body portion 36. Connection 27 is also joined with module controls 42 on one end and with PC connector 14 at the other end thereby providing the aforementioned electrical connection between module 2 and antenna 12 connected to PC connector 14.

Module 2 is substantially rectangular in shape as illustrated in FIG. 5A. One skilled in the art, however, will recognize that module 2 can be developed in virtually any shape to fit the specific geometrical constraints of the device in which it is located.

FIG. 5B is a partial side section view of one flex connector 29. The latter includes electrical contacts 80 and 82 provided on top surface 37 and bottom surface 84 of head portion 28. In addition, electrical connectors 86 and 88 are also formed on top and bottom surfaces 37 and 84. Electrical connectors 86 and 88 electrically connect contacts 80 and 82, respectively, with other areas on base 34. In at least one embodiment, a contact relay 90 that connects relays 86 and 88 may also be present in base 34. In an embodiment without contact relay connect 90, signals intercepted by contact 80 may be processed separately from signals intercepted by contact 82, and vice versa.

In operation, contacts 80 and or contacts 82 may intercept signals from the controls of device 4. The intercepted signals are sent via relays 86 and 88 to CPU 41 of module 2 and then returned to the device and or transmitted to a remote device via transceiver 43.

Figure 6A:
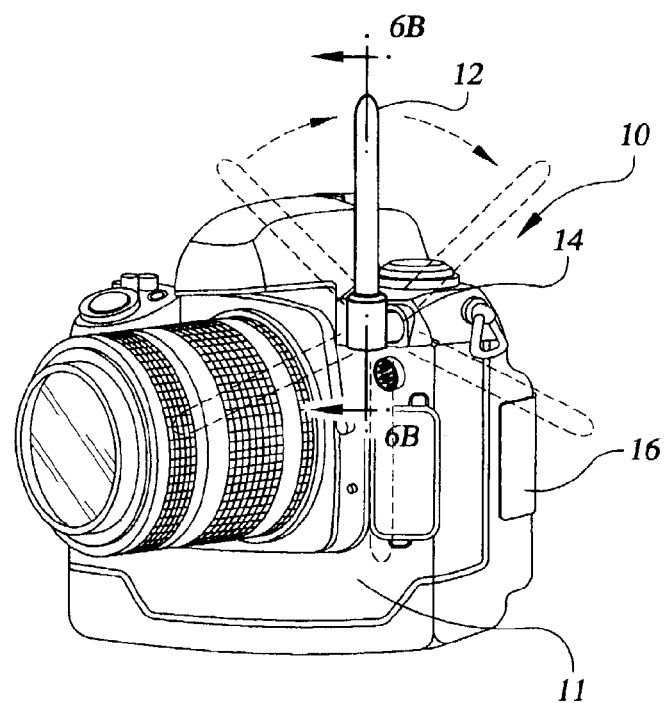
FIG. 6A is similar to FIG. 2, except that it shows the placement and range of motion of an antenna when installed in the PC connector port of a camera.
Figure 6B:
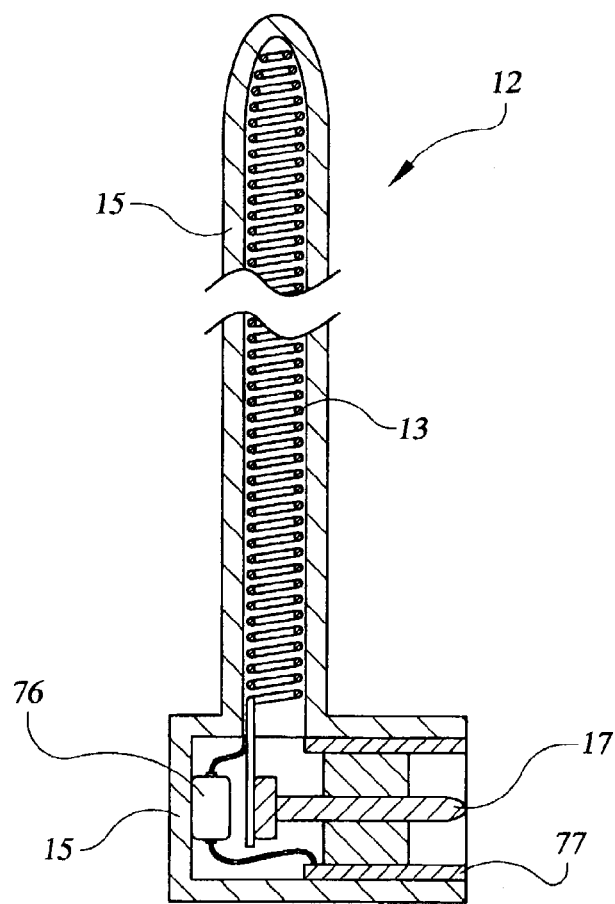
FIG. 6B is a side section view taken along line 6B—6B of FIG. 6A.

FIG. 6A–6B illustrate antenna 12 and its connection to PC connector 14. In one embodiment, antenna 12 is a copper-plated coiled spring 13 covered with a thin molded rubber cover 15 for protection. The exposed end of the copper-plated coiled spring is soldered to a male PC connector 17 before molding.

Antenna 12 is very easily connected to camera 10 by simply plugging the antenna into PC connector 14 on face 11 of the camera. As indicated by the dashed lines in FIG. 6A, antenna 12 is rotatably joined with PC connector 14. Such a connection allows a user flexibility in positioning antenna 12 at the most effective location for transmitting and receiving signals and allows the antenna to be positioned so as to accommodate the user's handling of the camera.

When not using the wireless transmission functionality of wireless communication module 2, antenna 12 can easily be removed from PC connector 14. Conversely, antenna 12 can be re-attached to PC connector 14 just as easily when the functionality of the wireless communication module is desired.

As mentioned above, and illustrated in FIG. 7, the wireless communication module of the present invention includes a central processing unit (CPU) 41. A CPU used in one embodiment of the invention is an in-system programmable microcontroller manufactured by Atmel of San Jose, Calif. and identified by model number AT90S8515. Other logic devices may also be satisfactorily employed as CPU 41. CPU 41 includes firmware for communicating with the camera controls. As described herein, reference will be made to actions taken by CPU 41. As one skilled in the art understands, the firmware program stored within CPU 41 is actually responsible for dictating the operations performed by the CPU.

Figure 7:
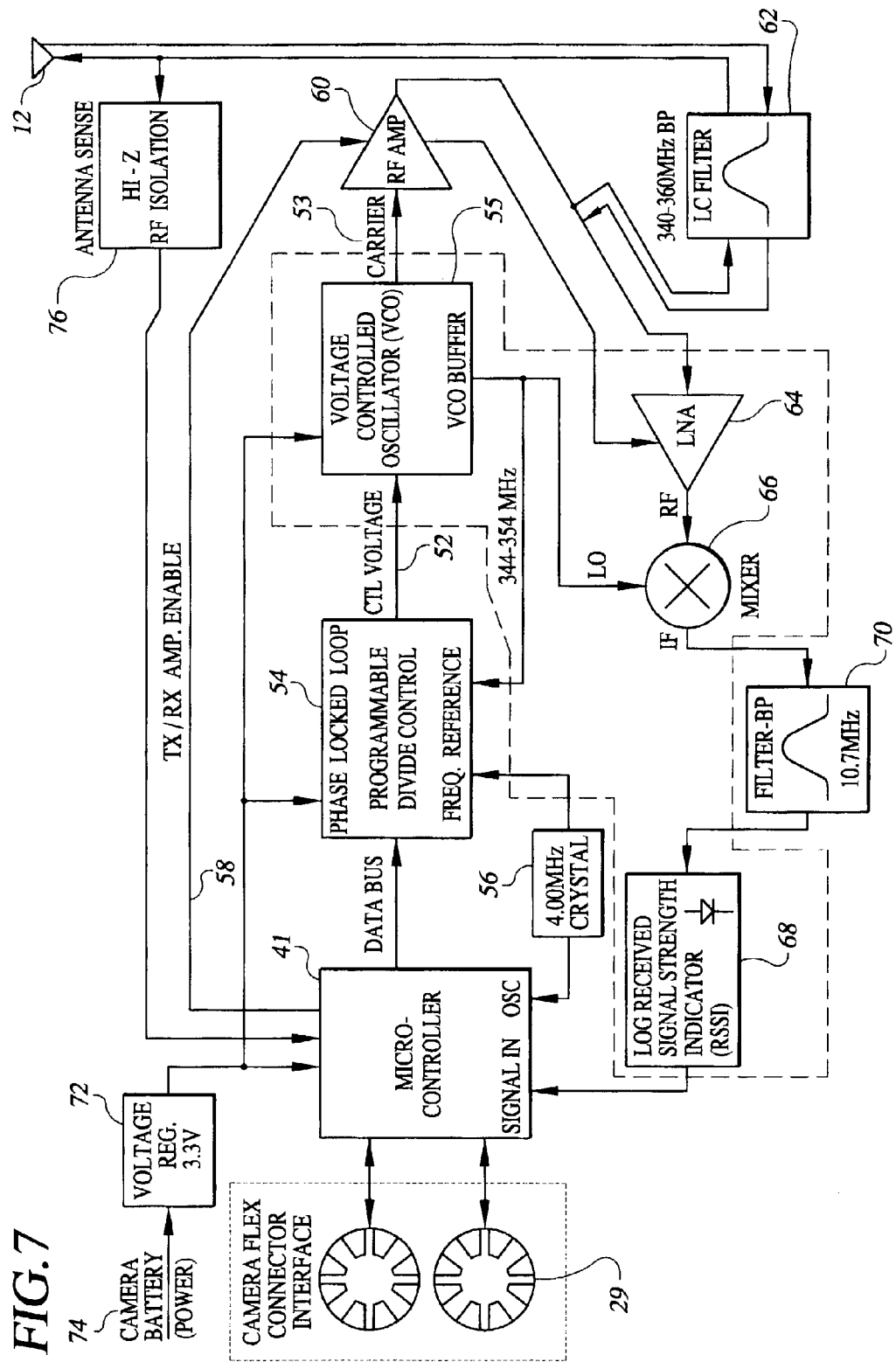
FIG. 7 is a block diagram that shows the elements of one embodiment of the wireless communication module of the present invention and associated elements of the camera with which the module is connected.

FIG. 7 illustrates the flow of data and the interaction between the controls of camera 10 and one embodiment of module 2 via the flex connector 29, CPU 41, and external devices via antenna 12. In this particular embodiment, module 2 includes a transceiver chip 43 or equivalent device capable of transmitting and receiving RF signals used in the communication of information between a camera 10 including module 2 and other devices such as a flashpack 22 (FIG. 3). A suitable transceiver chip 43 is manufactured by RF Micro Devices, Inc. of Greensboro, N.C., and is identified by model number RF2915. Although RF signals are utilized in one particular embodiment, the present invention encompasses all wireless communication technologies including cellular and infrared technologies.

In one embodiment, in transmission mode, transceiver chip 43 (indicated by dashed line in FIG. 7) of module 2 uses on/off keying (OOK) of a reference signal provided via line 52 that can be programmed anywhere between 344.04 MHz and 354.04 MHz with both 15 us and 25 us bit times (i.e., time it takes to transfer one bit) as its signaling means. Of course in other embodiments, phase shift keying (PSK) or frequency shift keying (FSK) may be used instead of OOK. The reference signal on line 52 is derived from a phase lock loop (PLL) 54 circuit that is controlled from CPU 41. A single 4.000 MHz crystal 56 is used both to provide reference input to CPU 41 and as the reference clock for PLL 54. CPU 41 sends a transmission enable signal along line 58 to start transmission of signals. PLL 54 has a lock detect output (not shown) that is monitored by CPU 41 to ensure reference signal 52 is on frequency before transmission is enabled.

PLL 54 sends the reference signal and line 52 to a voltage controlled oscillator (VCO) 55 connected to PLL 54. VCO 55 develops a signal carrier from the reference signal and sends the signal carrier on line 53 to a power amp 60. Power amp 60 amplifies the RF signal carried by the signal carrier.

In operation, when a trigger (i.e., a sync pulse) comes in from camera 10, via flex connector 29, CPU 41 enables the transmitter circuit contained in transceiver chip 43. CPU 41 then shifts out a serial command code by modulating a power amp 60 on and off. A logic 1 is represented by carrier on and a logic 0 by carrier off. When amp 60 is powered off during the 0 bits, the signal level drops by about 70 dB. The harmonics are kept low by way of a band pass filter 62 on the output of power amp 60 and by keeping the transmitter amplifier power level about 10 dB below its P1 dB limit. RF output power into antenna 12 is less than −5 dBm.

Every command code is sent twice (or more) with a pause in between. This is to increase reliability and also to keep the average duty cycle low.

In receive mode, CPU 41 enables a low-noise amplifier (LNA) 64 and mixer 66 built into transceiver chip 43. An indicator 68 known as the received signal strength indicator (RSSI) is monitored by the CPU's internal analog comparator to look for proper bit patterns from the transmitter circuit within transceiver chip 43. Band pass filter 70 is positioned between mixer 66 and RSSI 68 for removing unwanted frequencies. PLL 54 is set 10.7 MHz below the frequency that is being monitored. As can be assumed from the previous sentence, the intermediate frequency (IF frequency) is 10.7 MHz. Band pass filters 62 and 70 offer great selectivity to the IF section of transceiver chip 43. When implemented as 230 KHz ceramic band pass filters, filters 62 and 70 provide sensitivity in transceiver chip 43 of about −94 dBm for S/N of 12 dB.

A shield (not shown) is generally provided covering the entire RF section of body section 36 of module 28 to eliminate any signal leakage from PLL 54 to the outside. As the body of camera 10 is typically made of metal, additional shielding is provided. Of course, where the body is not made of metal, additional shielding materials may be provided as necessary.

Module 2 uses a linear voltage regulator IC 72 to maintain 3.3V internal from the camera's batteries 74. In one embodiment, module 2 draws about 13 mA while in receive mode and about 16 mA peak in the transmit mode. When the power switch (not shown) of camera 10 is turned off, module 2 goes into sleep mode where current draw is dropped to about 1 mA. Since a typical camera battery 74 is rated for about 200 mA-H, module 2 has a very small effect on overall battery drain.

Referring to FIGS. 1, 6B and 7, in one embodiment, module 2 is automatically activated when male connector pin 17 of antenna 12 is attached to PC connector 14. Other activation approaches, e.g., via controls of camera 10, are also encompassed by the present invention. An inductor 76 (FIG. 6B), e.g., a 470 mH inductor in one embodiment of the invention, is connected from antenna 12 to the ground connection (not shown) of PC connector 14 via antenna contact 77 (FIG. 6B). Inductor 76 has an inductance chosen to have a resonance at 350 MHz so that it looks like an open circuit to the RF signal, but presents a short circuit to ground at low DC frequencies. As one skilled in the art will understand, alternate devices such as capacitors, resistors, or similar mechanisms may be used in place of inductor 76. In such embodiments, activation and or deactivation of module 2 may be based on electrical events other than a short circuit (e.g., the measured current across an alternate device). This short circuit is typically detected by CPU 41 and is used to enable or disable radio operation. If the short circuit is not detected by CPU 41, module 2 knows antenna 12 is not connected. Antenna 12 is typically designed to have a resistance of about 50 ohms for easy production testing. As mentioned above, the bodies of many cameras are made of metal alloy, which also makes for a good ground for antenna 12.

Figure 8A:
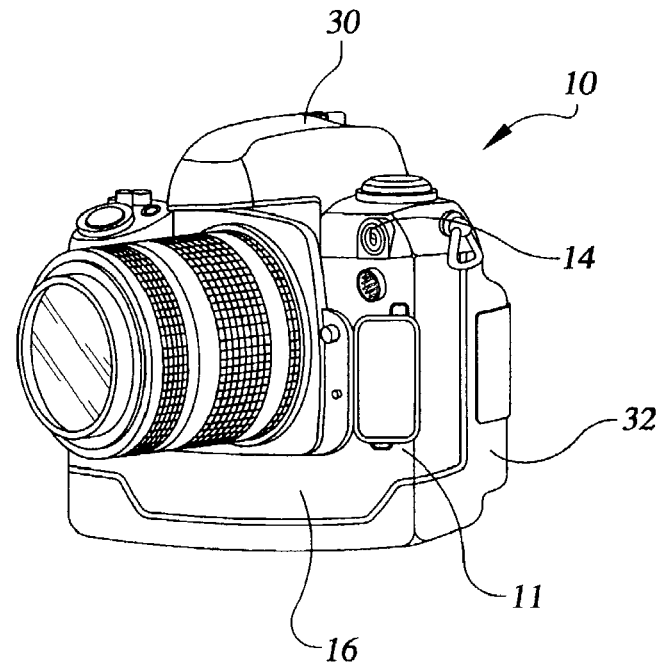
FIGS. 8A–8D are installation drawings showing the various stages of installation of one embodiment of the wireless communication module of the present invention in a camera.
Figure 8B:
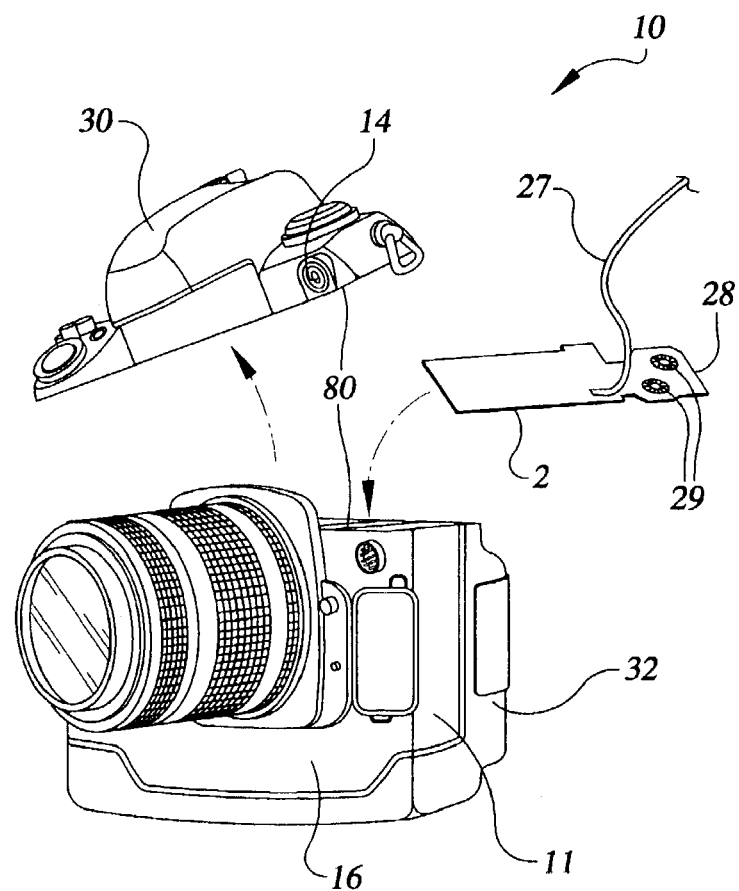
Figure 8C:
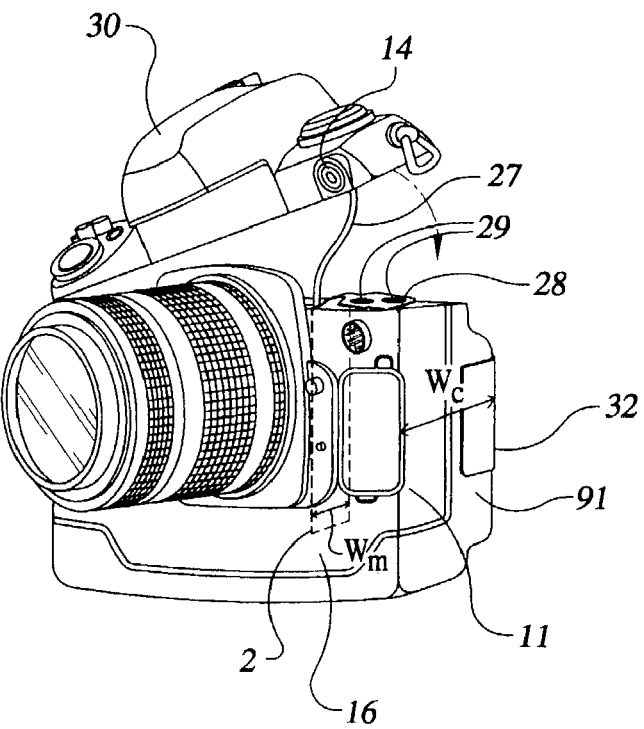

FIGS. 8A–8D illustrate one method of installing module 2 in a camera such as a Nikon D1. FIG. 8A shows camera 10 without module 2 installed. First, upper portion 30 of housing 11 is substantially detached from lower portion 32 of housing 11 thereby exposing the inside 80 of both portions 30, 32.

Next, wireless communication module 2 is inserted into lower portion 32 so that it will reside adjacent PC connector 14 when portions 30, 32 are reconnected. When inserted, top 28 of module 2 is closer to upper portion 30. Additionally, the width (Wm) of module 2 is typically oriented relative to the width (Wc) of a sidewall 91 so that surface 37 of module 2 is co-planar to sidewall 33. Of course, in devices other than the one illustrated in FIGS. 8A–8D, module 2 may be located and oriented in any manner within the device in order to facilitate connection of the module to the particular device's controls.

After insertion of module 2, head portion 28 is folded over so that it is substantially perpendicular to the remaining portions 36, 38 of module 2. At the same time, flex connectors 29 formed in head portion 28 are positioned so apertures 33 are aligned with the female screw holes (not shown) formed on lower portion 32 so that when upper and lower portions 30, 32 are reconnected, the screws joining them together pass through apertures 33 flex connectors 29. As a result, contacts 80 and 82 of flex connector 29 are electrically connected so as to receive camera control signals carried by the camera screws in apertures 33. Soldered connections are typically made to connect camera 10's power supply to module 2 and connect antenna wire 27 to PC connector 14 inside housing 16 of camera 10. Of course, as one skilled in the art will understand, there are myriad ways to connect module 2 to camera 10 other than soldered connections. After module 2 is joined with camera 10, upper portion 30 is reconnected to lower portion 32 thereby enclosing module 2 within body 16 of camera 10.

Figure 8D:
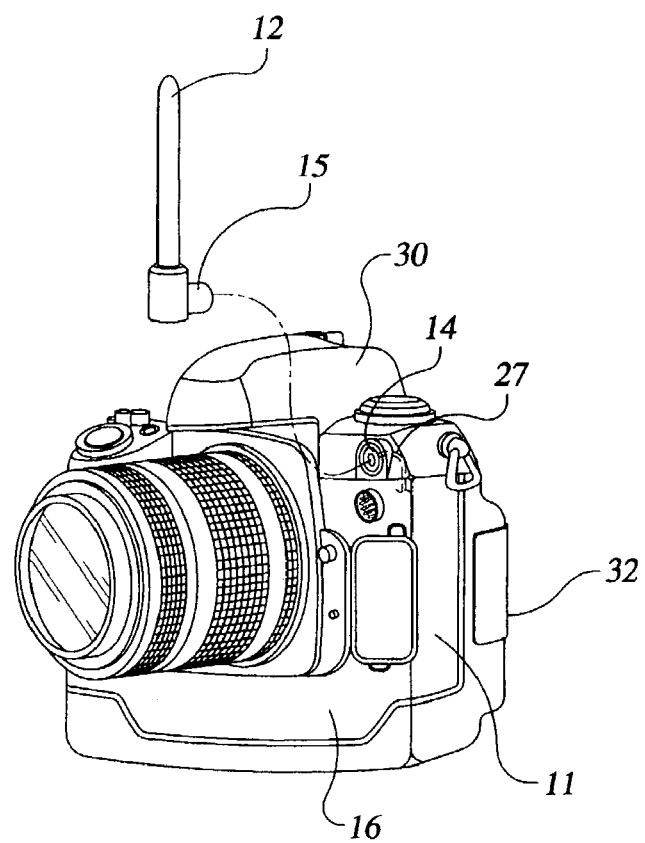

As illustrated in FIG. 8D, in one embodiment, the remote control functionality of module 2 is activated by attaching antenna 12 to PC connector 14 on housing 11 of camera 10, as described above.

As discussed above, in the embodiment illustrated in FIGS. 8A–8D, the screws and screw holes (not shown) that hold upper and lower portions 30 and 32 of camera body 16 together also serve as a communication path for transferring electrical signals between module 2 and the controls of camera 10. However, in other embodiments, screws may not be used to hold a camera's body together and therefore will not be available to serve as a point of connection with module 2. Alternative ways of creating a connection between module 2 and the controls of the device in which it resides are contemplated by the present invention. One such way is the direct connection (via soldering or similar methods of connection) of a wire from the camera controls to module 2.

As described herein, the wireless communication module 2 of the present invention is particularly suited for use with photographic equipment. FIG. 3 shows several different photographic applications of the wireless communication module of the present invention. However, as one skilled in the art will recognize, the wireless communication module of the present invention can be used in conjunction with any device that includes controls capable of communicating with CPU 41. Also, as described herein, wireless communication module 2 is also referred to as microcontroller radio card 2.

As further described herein, microcontroller radio card 2 is but one embodiment of a wireless communication module of the present invention. Other embodiments may includes non-RF transmission technologies as explained herein.

In addition, although the embodiment illustrated in FIG. 7 and described above delineates specific transmission frequencies, etc., one skilled in the art recognizes that other embodiments of the present invention may include any frequencies that provide acceptable transmission and reception of signals and are allowed by law.

Wireless communication module 2 of the present invention offers advantages over prior art devices because it makes it possible to convert a previously non-wireless device to a device having full wireless communication functionality. In addition, the original device does not have to be substantially altered or modified. Of course, the wireless communication module may be altered to fit within various geometrical configurations. Changes to the original device such as modifications to firmware or software or minor physical alterations to ensure the module will fit within the original device are not considered substantial alterations or modifications as defined herein. Rather, substantial modifications include comprehensive modifications to the structure of the original device that require new molding of the original device body, changes that substantially impact the costs of manufacturing the modified device as compared to the original device, and or changes that substantially impact the amount of time it takes to manufacture the modified device as compared to the original device. Nothing in the art exists to allow for such enhancements in existing devices.

While chip 43 is primarily described as providing RF signals, it is to be appreciated that the present invention encompasses the use of a chip that transmits and receives other signal types. These other signal types include infrared, sound, cellular, magnetic, and light pulse.

As a result, certain embodiments of the present invention have been disclosed and discussed herein, although it should be understood that the present invention is not limited to these (or any other) particular embodiment. On the contrary, the present invention is intended to cover all alternatives, modifications and equivalents that may be included within the spirit and scope of the appended claims.

What is claimed is:

1. A wireless communication module for insertion into a body of a camera to give the camera the ability to communicate with a remote device without disrupting normal camera function, the camera having camera controls and being originally designed without or with different, remote communication functionality, said module comprising:

a base sized and configured to be capable of being inserted into the camera body without substantially modifying the camera;

a transmitter or transceiver attached to said base; and a camera control signal intercept connector for operatively connecting said transmitter or transceiver to the camera controls, wherein the module, when inserted in the camera body and operatively connected to the camera controls via said connector, does not interfere with the normal function of the camera.

2. A module as in claim 1 wherein said base is operably joined with a detachable antenna, said antenna adapted to transmit and receive signals to and from the camera.

3. A module as in claim 1 further comprising a CPU, wherein said CPU is remotely programmable.

4. A wireless communication module according to claim 1 wherein said connector is a flex connector.

5. A wireless communication module according to claim 1 wherein said connector is capable of connecting to an electrical signal conduit in communication with the camera controls.

6. A wireless communication module according to claim 1 wherein the module allows the camera to remotely operate the second device.

7. A camera capable of remotely operating a second device, said camera comprising:
- a camera body including camera controls, mechanical controls, and a conductor for conducting electrical signals between said camera controls and said mechanical controls, said camera body being not originally designed to remotely operate a second device; and
- a microcontroller radio card having a transmitter or transceiver for transmitting signals from said camera body to the second device, said card sized for insertion into said camera body, said card directly connected to said conductor, thereby communicatively joining said card with said camera controls, said card not interfering with the normal function of the camera.

8. A camera as in claim 7 further comprising:
- a detachable antenna adapted to electrically connect with said microcontroller radio card; and
- sensing means for sensing connection of said antenna and switching said card to or from an active state upon sensing said antenna.

9. A camera according to claim 7 wherein said card intercepts the electrical signals.

10. A system for modifying a camera, the camera including a housing having camera controls, so that the camera is capable of remotely communicating with a second device without interfering with normal camera function, the system comprising:
- a microcontroller radio card having a transmitter or transceiver for transmitting signals from the camera to the second device, said card capable of being inserted into the camera without substantially modifying the housing, said card including a camera control signal intercept connector to be operatively connected to the camera controls, said card being sized and configured to be received in a camera body that was originally designed without, or with different, remote communication functionality, said card not interfering with the normal function of the camera.

11. A system for modifying a camera according to claim 10 wherein the second device is an external flash device.

12. A system according to claim 10 wherein the camera controls are in communication with a conduit to which said microcontroller radio card is connected thereby communicatively connecting the microcontroller radio card to the camera controls.

13. A system according to claim 10 wherein said microcontroller radio card allows the camera to remotely operate the second device.

14. A method of modifying a camera, the camera including a housing having camera controls, so that the camera is capable of remotely communicating with a second device without interfering with normal camera function, the method comprising the steps of:
- physically connecting a microcontroller radio card having wireless communication capabilities to the camera controls; and
- inserting said microcontroller radio card in the camera without substantially modifying the housing, wherein said microcontroller radio card is sized and configured to be received in a camera housing that was originally designed without, or with different, remote communication functionality, and wherein said microcontroller radio card does not interfere with the normal function of the camera.

15. A method according to claim 14 wherein after said inserting step, said camera remotely operates the second device.

16. A method according to claim 14 wherein said connecting of said microcontroller radio card to the camera controls is accomplished via an electrical signal conduit to which the camera controls are connected.

17. A wireless communication module for insertion into a camera without interfering with normal camera function, the camera having camera controls and a first processor for controlling the operation of the camera, said module comprising:
- a base capable of being inserted completely within the camera without substantially modifying the camera;
- a transmitter or transceiver attached to said base;
- a second processor attached to said base, said second processor controlling communication between the camera and a remote device; and
- a camera control signal intercept connector for operatively connecting said transmitter or transceiver to the camera controls,
- wherein the module, when inserted in the camera body and operatively connected to the camera controls via said connector, does not interfere with the normal function of the camera.

18. A wireless communication module according to claim 17 wherein said remote device is a flash device.

19. A wireless communication module according to claim 17 wherein said remote device is a remote camera.

20. A wireless communication module according to claim 17 wherein said base is operably joined with a detachable antenna, said antenna adapted to transmit and receive signals to and from the camera.

21. A wireless communication module according to claim 17 wherein said connector is a flex connector.

22. A wireless communication module according to claim 17 wherein said second processor is remotely programmable.

23. A wireless communication nodule according to claim 17 wherein said connector is capable of connecting to an electrical signal conduit in communication with the camera controls.

24. A wireless communication module according to claim 17 wherein the module allows the camera to remotely operate the second device.

25. A system for modifying a camera, the camera including a housing having camera controls and a first processor for controlling the camera, so that the camera is capable of remotely communicating with a second device without interfering with normal camera function, the system comprising:
- a microcontroller radio card having a transmitter or transceiver for transmitting signals from the camera to the second device, said card capable of being inserted completely within the camera without substantially modifying the housing, said card including a camera control signal intercept connector to be operatively connected to the camera controls, said card having thereon a second processor for controlling communication between the camera and the second device, said card, when inserted in the camera body and operatively connected to the camera controls via said connector, not interfering with the normal function of the camera.

26. A system according to claim 25 wherein the camera controls are in communication with a conduit to which said microcontroller radio card is connected thereby communicatively connecting the microcontroller radio card to the camera controls.

27. A system according to claim 25 wherein the system allows said microcontroller radio card to control the second device.

28. A method of modifying a camera, the camera including a housing having camera controls and a first processor for controlling the camera operation, so that the camera is capable of remotely communicating with a second device without interfering with normal camera function, the method comprising the steps of:

operatively connecting a microcontroller radio card having wireless communication capabilities to the camera controls, said microcontroller radio card having thereon a second processor for controlling the communicating; and inserting said microcontroller radio card completely within the camera without substantially modifying the housing or interfering with normal camera function.

29. A method according to claim 28 further comprising remotely operating the second device with said camera.

30. A method according to claim 28 wherein said connecting of said microcontroller radio card to the camera controls is accomplished via an electrical signal conduit to which the camera controls are in communication.

31. A wireless communication module for insertion into a body of a camera to give the camera the ability to communicate with a remote device without disrupting normal camera function, the camera having camera controls and being originally designed without, or with different, remote communication functionality, said module comprising:

a base sized and configured to be capable of being inserted into the camera body without substantially modifying the camera;

a transmitter or transceiver attached to said base; and a connector for operatively connecting said transmitter or transceiver to the camera controls, wherein the module, when inserted in the camera body and operatively connected to the camera controls via said connector, does not interfere wit the normal function of the camera, and wherein said base is operably joined with a detachable antenna, said antenna adapted to transmit and receive signals to and from the camera.

* * * * *

UNITED STATES PATENT AND TRADEMARK OFFICE
CERTIFICATE OF CORRECTION

| | | |
|---|---|---|
| PATENT NO. | : 7,016,603 B2 | Page 1 of 1 |
| APPLICATION NO. | : 10/306759 | |
| DATED | : March 21, 2006 | |
| INVENTOR(S) | : James E. Clark | |

It is certified that error appears in the above-identified patent and that said Letters Patent is hereby corrected as shown below:

Column 10, line 50, after "without" insert -- , --.

Column 12, line 45, delete "nodule" insert -- module-- therefor.

Column 14, line 19, delete "wit" insert -- with -- therefor.

Signed and Sealed this

Twenty-sixth Day of December, 2006

JON W. DUDAS
*Director of the United States Patent and Trademark Office*